(12) United States Patent
Suzuki

(10) Patent No.: US 8,233,110 B2
(45) Date of Patent: Jul. 31, 2012

(54) LIQUID CRYSTAL MODULE

(75) Inventor: Yuto Suzuki, Osaka (JP)

(73) Assignee: Funai Electric Co., Ltd., Osaka (JP)

(*) Notice: Subject to any disclaimer, the term of this patent is extended or adjusted under 35 U.S.C. 154(b) by 249 days.

(21) Appl. No.: 12/694,807

(22) Filed: Jan. 27, 2010

(65) Prior Publication Data

US 2010/0188598 A1    Jul. 29, 2010

(30) Foreign Application Priority Data

Jan. 28, 2009  (JP) ............... P. 2009-016622

(51) Int. Cl.
*G02F 1/1333* (2006.01)
(52) U.S. Cl. ....................................... 349/58
(58) Field of Classification Search .............. None
See application file for complete search history.

(56) References Cited

U.S. PATENT DOCUMENTS

| 2003/0122992 A1 | 7/2003 | Hayashimoto et al. ......... 349/58 |
| 2006/0023141 A1 | 2/2006 | Oka |
| 2007/0117418 A1 | 5/2007 | Azuma et al. ................. 439/67 |

FOREIGN PATENT DOCUMENTS

JP    2006-39159    2/2006

*Primary Examiner* — Lucy Chien
(74) *Attorney, Agent, or Firm* — Morgan, Lewis & Bockius LLP

(57) ABSTRACT

A liquid crystal module is provided. A cell guide is attached to a rear frame and including at least a vertical plate portion and a convex portion provided on the vertical plate portion. A liquid crystal panel is mounted on the cell guide. A relay substrate is attached to the cell guide such that the relay substrate is provided along the vertical plate portion of the cell guide. A chip on film electrically connects the liquid crystal panel and the relay substrate. A lower end portion of the relay substrate is interposed between the vertical plate portion and the convex portion of the cell guide.

7 Claims, 5 Drawing Sheets

LIQUID CRYSTAL MODULE

The disclosure of Japanese Patent Application No. 2009-016622 filed on Jan. 28, 2009 including specification, drawings and claims is incorporated herein by reference in its entirety.

BACKGROUND

The present invention relates to a liquid crystal module to be incorporated into a liquid crystal television having a large-screen. Particularly, the present invention relates to a liquid crystal module including means for fixing a relay substrate to a cell guide, the relay substrate connected to a liquid crystal panel (liquid crystal cell) through a chip on film.

As shown in FIG. 6, in a related-art liquid crystal module, a cell guide 102 is attached to a side plate 101 of a rear frame 100, and the edge of a liquid crystal panel 103 is mounted on the cell guide 102. In addition, a relay substrate 105 connected to the edge of the liquid crystal panel 103 through a chip on film 104 is attached along a vertical plate portion 102a of the cell guide 102, and a bezel 106 is attached so as to cover the cell guide 102 to which the relay substrate 105 is attached, the chip on film 104, and the edge of the liquid crystal panel 103. Then, a cushion member 107, such as a sponge, is attached to the relay substrate 105, and the cushion member 107 comes into contact with a vertical plate portion 106a of the bezel 106. In this way, it is possible to prevent the curvature, backlash, and vibration (chatter) of the relay substrate 105.

In addition, JP-A-2006-39159 discloses a related-art liquid crystal module. In this liquid crystal module, a relay substrate connected to a liquid crystal panel through an FPC is provided on an outer wall of a case so as to cover a through hole that is formed in the outer wall of the case, the relay substrate is supported by the leading ends of cylindrical ribs and bosses formed on the case, and the relay substrate is screwed to the bosses.

However, in the related-art liquid crystal module shown in FIG. 6, it is necessary to attach the cushion member 107 to the relay substrate 105 in order to prevent the curvature, backlash, and vibration of the relay substrate 105. Therefore, the number of parts or the number of assembly processes increases, which results in an increase in manufacturing costs.

In the related-art liquid crystal module disclosed in JP-A-2006-39159, the relay substrate is screwed. Therefore, it requires labor to screw the relay substrate, and assembly workability is lowered.

SUMMARY

It is therefore an object of at least one embodiment of the present invention to provide a liquid crystal module capable of preventing the curvature, backlash, and vibration (chatter) of a relay substrate without a cushion member and simply attaching the relay substrate to a cell guide without using screws.

In order to achieve the above described object, according to an aspect of at least one embodiment of the present invention, there is provided a liquid crystal module comprising: a rear frame; a cell guide attached to the rear frame and including at least a vertical plate portion and a convex portion provided on the vertical plate portion; a liquid crystal panel mounted on the cell guide; a relay substrate attached to the cell guide such that the relay substrate is provided along the vertical plate portion of the cell guide; and a chip on film electrically connecting the liquid crystal panel and the relay substrate, wherein a lower end portion of the relay substrate is interposed between the vertical plate portion and the convex portion of the cell guide. The cell guide may further include a horizontal plate portion, and the liquid crystal panel may be mounted on the horizontal plate portion of the cell guide. The rear frame may have a bottom plate and a side plate, and the cell guide may be attached to the side plate of the rear frame.

With this structure, by the convex portion of the cell guide, it is possible to prevent the curvature of the relay substrate to the outside of the liquid crystal module, the backlash and the vibration of the relay substrate. In addition, it is possible to prevent the cutting of the chip on film due to the curvature of the relay substrate. Accordingly, it is possible to remove (omit) the cushion member and thus reduce the number of parts or the number of assembly processes, which results in a reduction in manufacturing costs.

A central portion of the lower end portion in a longitudinal direction of the relay substrate may be interposed between the vertical plate portion and the convex portion of the cell guide.

With this structure, it is possible to effectively prevent the curvature, backlash, and vibration of the relay substrate.

The relay substrate may be attached to the vertical plate portion of the cell guide as follows. The upper end portion of the relay substrate is hooked to a hook portion provided at the upper end of the vertical plate portion of the cell guide, and the relay substrate is pivoted about the hook portion from the outside of the liquid crystal module toward the vertical plate portion of the cell guide so as to forcibly go over the convex portion. Then, the lower end portion of the relay substrate is interposed between the convex portion and the vertical plate portion of the cell guide. Therefore, it is possible to easily attach the relay substrate, as compared to JP-A-2006-39159 in which the relay substrate is screwed.

In this case, the cell guide may further include: a pair of protruding pieces which are arranged on an outer surface of the vertical plate portion at both sides of the convex portion, respectively; and a leaf spring which is provided between the protruding pieces, and the convex portion may be disposed on the leaf spring.

With this structure, when the lower end portion of the relay substrate goes over the convex portion, the leaf spring is elastically curved downward and the convex portion goes down. Therefore, the relay substrate can easily go over the convex portion. Accordingly, it is possible to further improve the attachment workability of the relay substrate.

The convex portion may be formed into a substantially right-angled triangle in a side view, which includes: an inclined plane which is downwardly inclined toward an outer side of the liquid crystal module and a vertical plane which comes in contact with the lower end portion of the relay substrate.

With this structure, the inclined plane serves as a guide surface and the relay substrate can smoothly go over the convex portion. Therefore, it is possible to further improve the attachment workability of the relay substrate. After the relay substrate is attached to the cell guide, the lower end portion of the relay substrate is interposed between the vertical plane of the convex portion and the vertical plate portion of the cell guide. In this way, the curvature, backlash, and vibration (chatter) of the relay substrate can be prevented.

The rear frame may have a bottom plate and a side plate which is formed into an inverted U-shape to have an inner side plate and an outer side plate, and the cell guide may further include: an engaging claw portion which protrudes from an inner surface of the vertical plate portion and engages with a lower end portion of the outer side plate; and a pair of cutouts which are formed of the vertical plate portion at both sides of the engaging claw, respectively, and extend from a lower side toward an upper side of the vertical plate portion.

With this structure, elasticity is given to a part of the vertical plate portion, which is disposed between the two cutouts of the cell guide, and the engaging claw which protrudes from the inner surface of the vertical plate portion can engage with the outer plate of the double side plates of the rear frame from the lower side. In this way, the cell guide can be easily attached to the rear frame.

According to another aspect of at least one embodiment of the present invention, there is provided a liquid crystal module comprising: a rear frame; a cell guide attached to the rear frame and including at least a vertical plate portion and a convex portion provided on the vertical plate portion; a liquid crystal panel mounted on the cell guide; a relay substrate attached to the cell guide such that the relay substrate is provided along the vertical plate portion of the cell guide; and a chip on film electrically connecting the liquid crystal panel and the relay substrate, wherein only the cell guide supports and fixes the relay substrate.

BRIEF DESCRIPTION OF THE DRAWINGS

The above objects and advantages of the present invention will become more apparent by describing in detail preferred exemplary embodiments thereof with reference to the accompanying drawings, wherein.

DETAILED DESCRIPTION OF THE EMBODIMENTS

Figure 1:
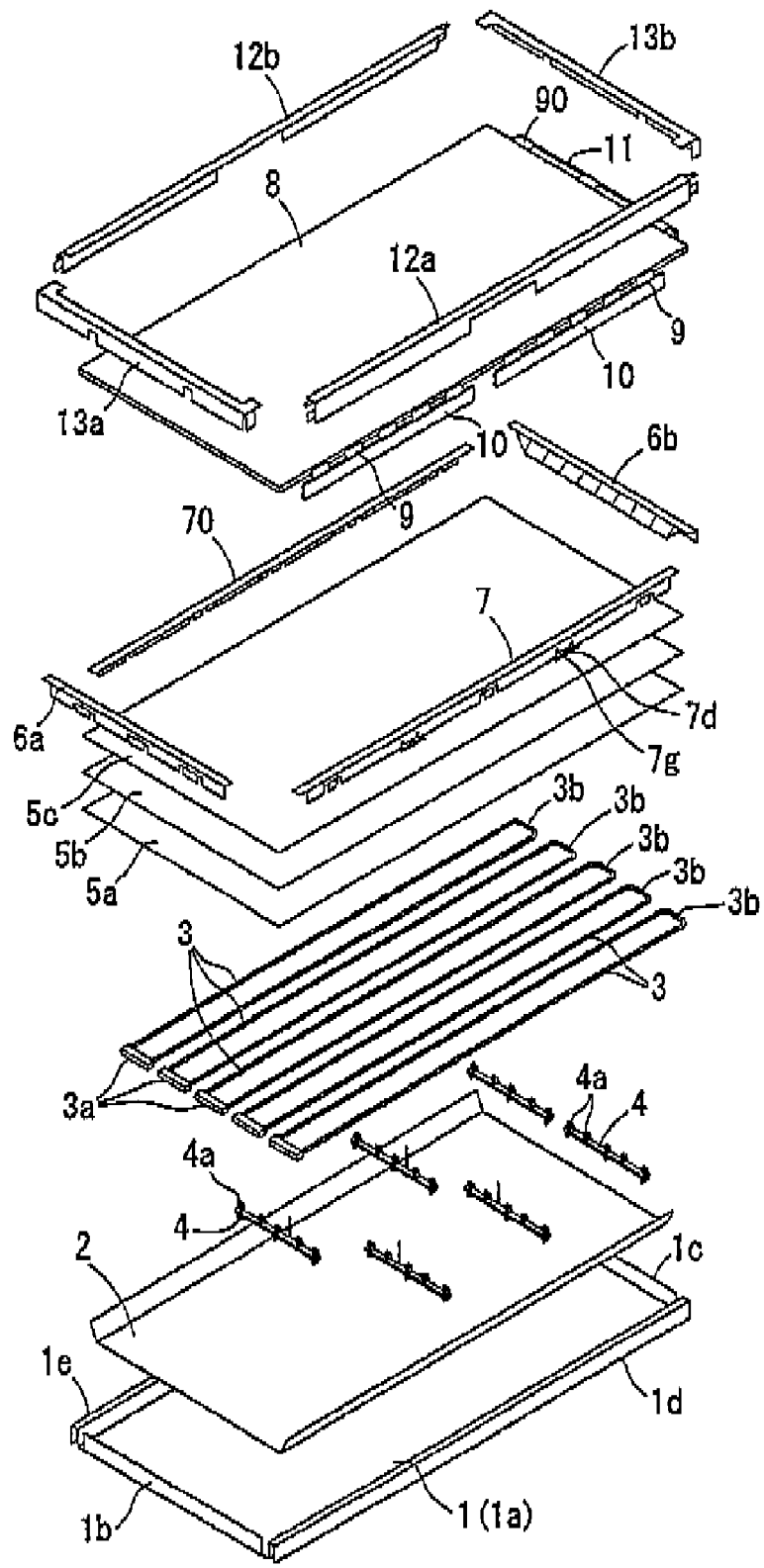
FIG. 1 is an exploded perspective view illustrating a liquid crystal module according to an embodiment of the present invention.

Embodiments of the invention will be described with reference to the accompanying drawings. First, the overall structure of a liquid crystal module according to an embodiment of the invention will be described with reference to FIGS. 1 and 2. The liquid crystal module according to this embodiment is a large liquid crystal module to be incorporated into a large-screen liquid crystal television. In the liquid crystal module, a light reflecting sheet 2 is provided in a shallow box-shaped rear frame 1 made of a metal plate. A plurality of U-shaped cold cathode tubes 3 (five cold cathode tubes in this embodiment) is provided on the light reflecting sheet 2 in parallel to each other. The U-shaped cold cathode tubes 3 are fitted into open circular holding portions 4a of lamp holders 4 that are fixed to a bottom plate 1a of the rear frame 1 on the light reflecting sheet 2 and are held by the circular holding portions 4a.

A lamp socket 3a is attached to the end (the end of a feed terminal) of each of the U-shaped cold cathode tubes 3, and the lamp sockets 3a are fitted into socket fixing holes (not shown) that are formed in the bottom plate 1a of the rear frame 1 along one short side plate 1b of the rear frame 1. The ends of the U-shaped cold cathode tubes 3 having the lamp sockets 3a attached thereto are covered with a lamp frame 6a that is attached to one side plate 1b of the rear frame 1 in order to remove a variation in brightness due to, for example, the shade of the lamp sockets 3a. U-shaped curved ends 3b, which are opposite to the lamp sockets, of the U-shaped cold cathode tubes 3 are exposed from a lamp frame 6b that is attached to a side plate 1c, which is opposite to the side plate 1b, of the rear frame 1 such that light emitted from the U-shaped curved ends 3b are effectively used.

Long side plates 1d and 1e of the rear frame 1 are double side plates that are bent in an inverted U-shape. The edges of three optical sheets 5a, 5b, and 5c are mounted on the upper surfaces of the double side plates 1d and 1e and are inserted into sheet insertion grooves (not shown) of the lamp frames 6a and 6b. These optical sheets are light diffusion sheets that diffuse light emitted from the U-shaped cold cathode tubes 3 such that the light is uniformly incident on a liquid crystal panel 8. The two upper optical sheets 5b and 5c are thin light diffusion sheets, but the lower optical sheet 5a is a light diffusion sheet (light diffusion plate) that is thick enough not to be curved.

The edges of the long sides of the optical sheets 5a, 5b, and 5c are pressed by cell guides (liquid crystal panel supporting members) 7 and 70 that are attached to the double side plates 1d and 1e of the rear frame 1. The edge of the liquid crystal panel (liquid crystal cell) 8 is mounted on the cell guides 7 and 70 and the lamp frames 6a and 6b that also serve as cell guides.

Figure 2:
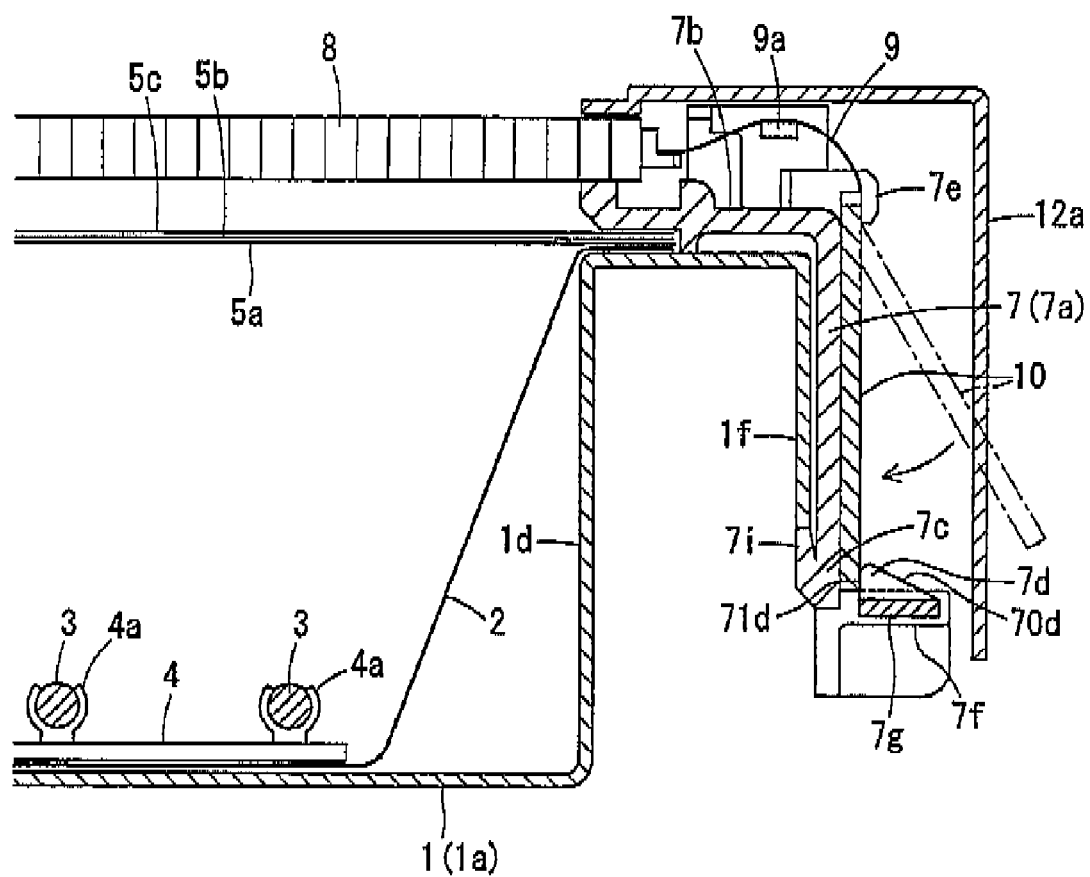
FIG. 2 is a partial cross-sectional view illustrating the liquid crystal module.

Two relay substrates 10 (X-PCB) having a rectangular shape elongated in the horizontal direction are connected to one long side of the liquid crystal panel 8 through a plurality of chip on films 9 (COF) each having a source driver IC chip 9a (see FIG. 2) mounted thereon. As shown in FIG. 2, the relay substrates 10 are attached along a vertical plate portion 7a of the cell guide 7. In addition, a relay substrate 11 (Y-PCB) having a rectangular shape elongated in the horizontal direction is connected to one short side of the liquid crystal panel 8 through a chip on film 90 having a gate driver IC chip mounted thereon. The relay substrate 11 (Y-PCB) is attached to the outer surface of the lamp holder 6b.

Two long bezels 12a and 12b and two short bezels 13a and 13b are combined in a rectangular frame shape and are screwed to the rear frame 1 to surround the edge of the liquid crystal module. In this way, as shown in FIG. 2, the long bezel 12a covers the cell guide 7 attached to the relay substrate 10 (X-PCB), the chip on film 9, and the edge of the liquid crystal panel 8.

Figure 3:
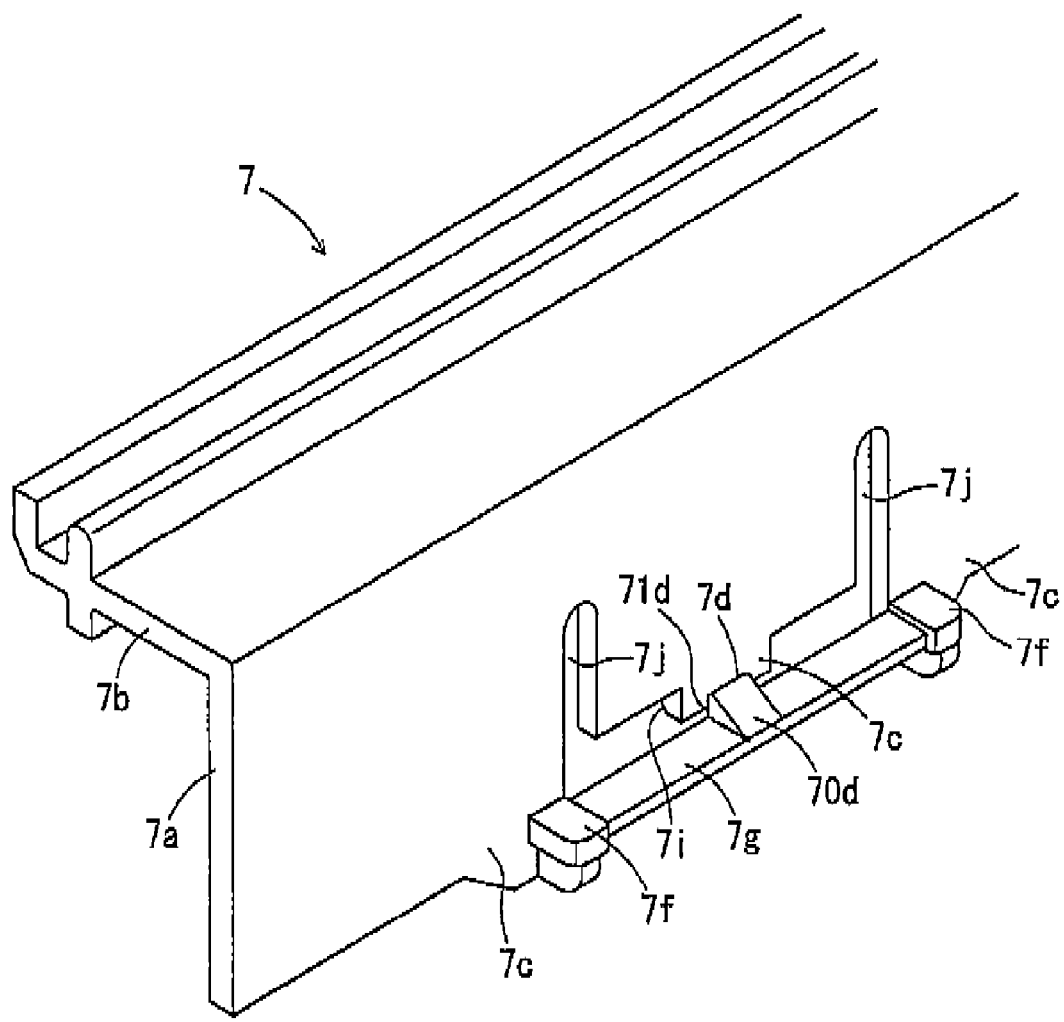
FIG. 3 is a partial perspective view illustrating a cell guide of the liquid crystal module.
Figure 4:
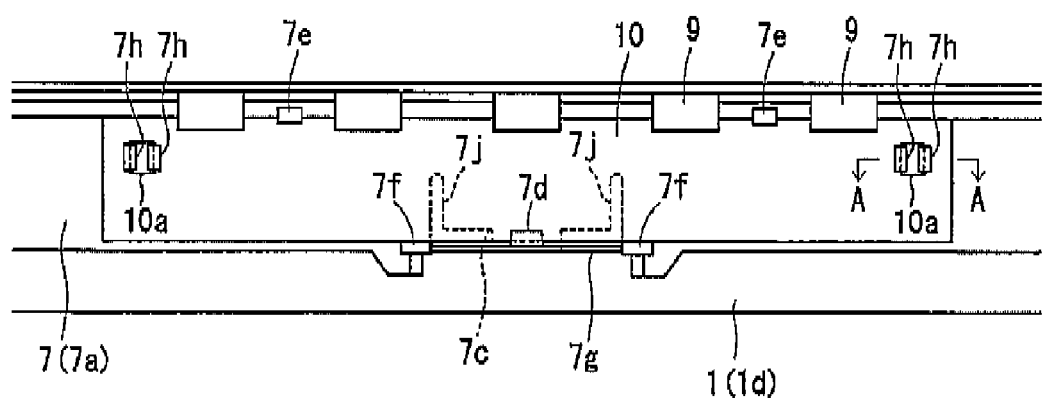
FIG. 4 is a partial side view illustrating the liquid crystal module without a bezel.

As shown in FIGS. 2 and 3, the cell guide 7 to which the relay substrates 10 is attached is a molding that is made of a synthetic resin and has a hook shape in a cross-sectional view. The cell guide 7 includes the vertical plate portion 7a and a horizontal plate portion 7b that are integrally formed. A convex portion 7d is provided on the outside of a vertical plate lower portion 7c (a lower portion of the vertical plate portion 7a) with a gap that is equal to or slightly more than the thickness of the relay substrate 10 therebetween. In addition, a hook portion 7e for hooking the upper end of the relay substrate 10 is provided at an upper part of the vertical plate. As shown in FIG. 4, the convex portion 7d is provided at a central portion of the lower end of the relay substrate 10 in the longitudinal direction of the relay substrate 10. A plurality of hook portions 7e is provided between the chip on films 9.

As shown in FIG. 3, a pair of protruding pieces 7f is provided on both sides of the convex portion 7d so as to protrude from the vertical plate lower portion 7c of the cell guide 7 to the outside of the liquid crystal module. A leaf spring 7g that can be elastically curved downward is provided between the protruding pieces 7f. The convex portion 7d is provided at the center of the upper surface of the leaf spring 7g. As shown in FIGS. 2 and 3, the convex portion 7d is a claw-shaped convex portion having a substantially right-angled triangle shape in a side view, and includes an inclined plane 70d that is downwardly inclined toward the outside of the liquid crystal module and a vertical plane 71d that comes into contact with the lower end of the relay substrate 10.

Figure 5:
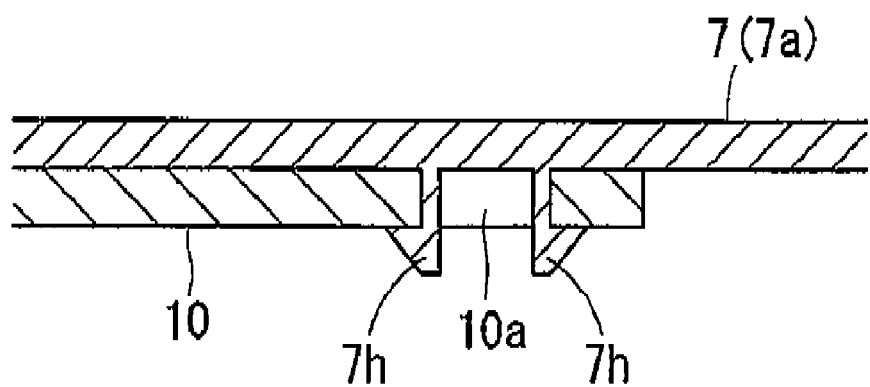
FIG. 5 is a cross-sectional view taken along the line A-A of FIG. 4.
Figure 6:
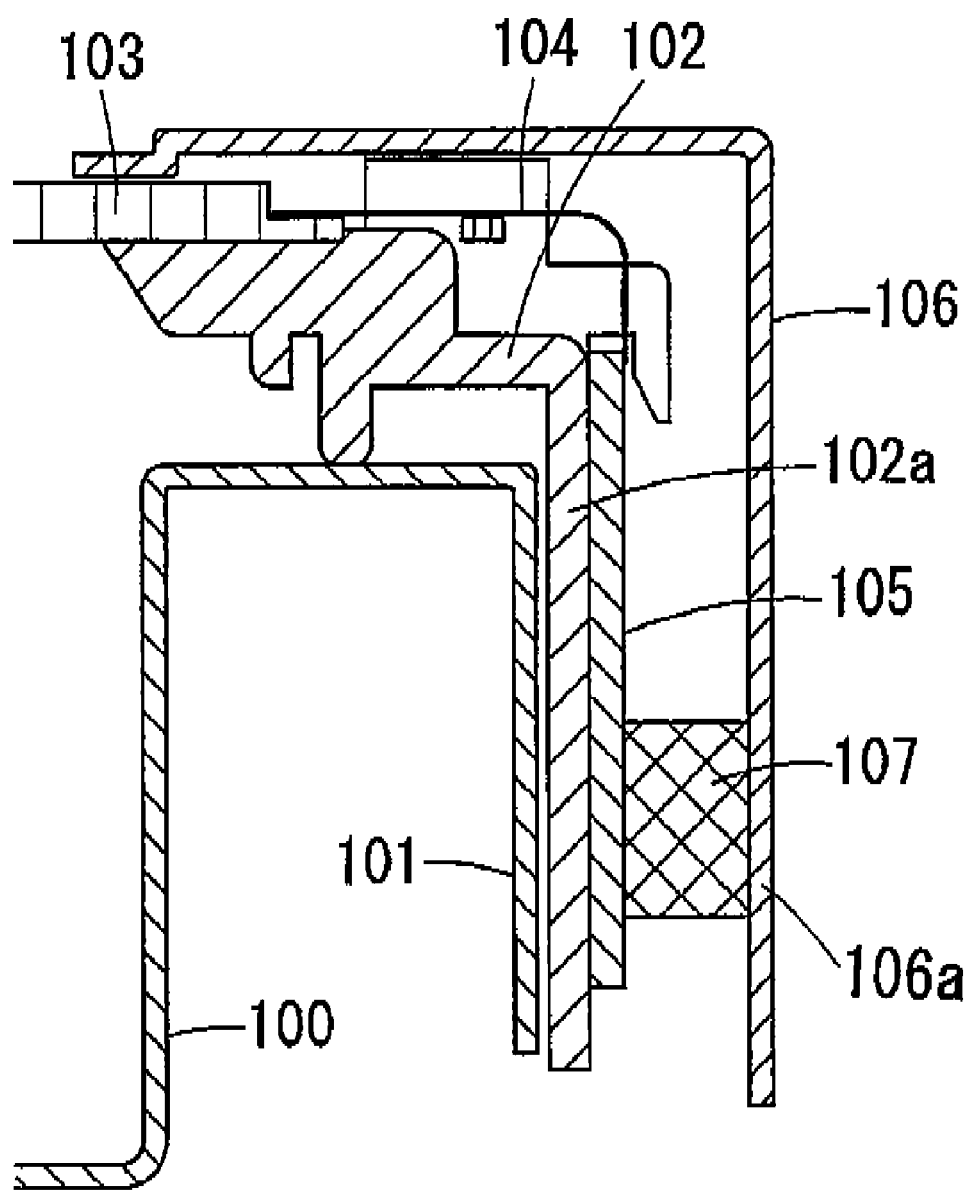
FIG. 6 is a partial cross-sectional view illustrating a liquid crystal module according to the related art.

As represented by a virtual line in FIG. 2, the relay substrate 10 is attached as follows. The upper end of the relay substrate 10 is hooked to the hook portion 7e provided at the upper part of the vertical plate of the cell guide 7, and the relay substrate 10 is pivoted about the hook portion 7e from the outside toward the vertical plate portion 7a of the cell guide 7 so as to forcibly go over the claw-shaped convex portion 7d. Then, the lower end of the relay substrate 10 is interposed between the claw-shaped convex portion 7d and the vertical plate lower portion 7c of the cell guide. In this case, the leaf spring 7g is elastically curved downward and the claw-shaped convex shape 7d goes down. Therefore, the lower end of the relay substrate 10 can easily go over the claw-shaped convex portion 7d. In particular, since the inclined plane 70d of the claw-shaped convex portion 7d serves as a guide surface, the lower end of the relay substrate 10 can smoothly go over the claw-shaped convex portion 7d. Both ends of the relay substrate 10 are fixed as follows. As shown in FIGS. 4 and 5, locking pieces 7h with detachment prevention claws that protrude from the vertical plate portion 7a of the cell guide 7 are inserted into holes 10a that are formed at both ends of the relay substrate 10, and the detachment prevention claws of the locking pieces 7h are locked to the edges of the holes. In this structure, only the cell guide 7 supports and fixes the relay substrate 10.

In the liquid crystal module, as described above, the central portion of the lower end of the relay substrate 10 in the longitudinal direction of the relay substrate 10 is interposed between the claw-shaped convex portion 7d and the vertical plate lower portion 7c of the cell guide 7, and both ends of the relay substrate 10 are fixed to the locking pieces 7h. Therefore, the curvature of the relay substrate 10 to the outside is prevented by the vertical plane 71d of the claw-shaped convex portion 7d, and the backlash or vibration (chatter) of the relay substrate 10 is prevented. In addition, the cutting of the chip on film 9 due to the curvature of the relay substrate 10 is also prevented. Therefore, it is possible to remove the cushion member 107 according to the related art and thus reduce the number of parts or the number of assembly processes, which results in a reduction in manufacturing costs. In addition, since the relay substrate 10 is not screwed, it is possible to simply attach the relay substrate, as compared to the structure in which the relay substrate is screwed.

In the liquid crystal module, as shown in FIGS. 2 and 3, a locking claw 7i that is locked to the lower end of an outer plate 1f of the double side plate 1d of the rear frame 1 from the lower side protrudes from the inner surface of the plate lower portion 7c which is opposite to the convex portion 7d of the cell guide 7. Cutouts 7j are formed in the vertical plate portion 7a of the cell guide 7 from the lower side to the upper side on both sides of the locking claw 7i. In this way, elasticity is given to a part of the vertical plate portion, which is disposed between the two cutouts 7j. Therefore, the locking claw 7i can be locked to the outer plate 1f of the double side plates of the rear frame from the lower side and the cell guide 7 can be simply and reliably attached to the double side plate 1d of the rear frame 1. In addition, the lower end of the relay substrate 10 is easily interposed between the convex portion 7d and the vertical plate lower portion 7c of the cell guide 7.

Since the relay substrate 10 is not attached to another cell guide 70, this cell guide 70 is not provided with the convex portion 7d or the leaf spring 7g. However, the cell guide 7 may be used instead of the cell guide 70.

In the liquid crystal module, the convex portion 7d or the leaf spring 7g is not provided outside a lower part of the outer surface of the lamp frame 6b to which the relay substrate 11 (Y-PCB) is attached. However, if necessary, the claw-shaped convex portion or the leaf spring may be provided outside the lower part of the outer surface of the lamp frame 6b and the lower end of the relay substrate 11 may be attached between the claw-shaped convex portion and the lower part of the outer surface of the lamp frame 6b.

While the present invention has been shown and described with reference to certain exemplary embodiments thereof, it will be understood by those skilled in the art that various changes in form and details may be made therein without departing from the spirit and scope of the invention as defined by the appended claims.

What is claimed is:
1. A liquid crystal module comprising:
   a rear frame;
   a cell guide attached to the rear frame and including at least a vertical plate portion and a convex portion provided on the vertical plate portion;
   a liquid crystal panel mounted on the cell guide;
   a relay substrate attached to the cell guide such that the relay substrate is provided along the vertical plate portion of the cell guide;
   a chip on film electrically connecting the liquid crystal panel and the relay substrate,
   wherein a lower end portion of the relay substrate is interposed between the vertical plate portion and the convex portion of the cell guide;
   wherein the cell guide further includes:
      a pair of protruding pieces which are arranged on an outer surface of the vertical plate portion at both sides of the convex portion, respectively; and
      a leaf spring which is provided between the protruding pieces, and
   wherein the convex portion is disposed on the leaf spring.
2. The liquid crystal module as set forth in claim 1,
   wherein the cell guide further includes a horizontal plate portion, and
   wherein the liquid crystal panel is mounted on the horizontal plate portion of the cell guide.
3. The liquid crystal module as set forth in claim 1,
   wherein the rear frame has a bottom plate and a side plate, and
   wherein the cell guide is attached to the side plate of the rear frame.
4. The liquid crystal module as set forth in claim 1, wherein a central portion of the lower end portion in a longitudinal direction of the relay substrate is interposed between the vertical plate portion and the convex portion of the cell guide.
5. The liquid crystal module as set forth in claim 1, wherein the convex portion is formed into a substantially right-angled triangle in a side view, which includes: an inclined plane which is downwardly inclined toward an outer side of the liquid crystal module and a vertical plane which comes in contact with the lower end portion of the relay substrate.
6. The liquid crystal module as set forth in claim 1,
   wherein the rear frame has a bottom plate and a side plate which is formed into an inverted U-shape to have an inner side plate and an outer side plate, and
   wherein the cell guide further includes:

an engaging claw portion which protrudes from an inner surface of the vertical plate portion and engages with a lower end portion of the outer side plate; and a pair of cutouts which are formed of the vertical plate portion at both sides of the engaging claw, respectively, and extend from a lower side toward an upper side of the vertical plate portion.

7. A liquid crystal module comprising:

a rear frame;

a cell guide attached to the rear flame and including at least a vertical plate portion and a convex portion provided on the vertical plate portion;

a liquid crystal panel mounted on the cell guide;

a relay substrate attached to the cell guide such that the relay substrate is provided along the vertical plate portion of the cell guide; and a chip on film electrically connecting the liquid crystal panel and the relay substrate, wherein only the cell guide supports and fixes the relay substrate, wherein the cell guide further includes:

a pair of protruding pieces which are arranged on an outer surface of the vertical plate portion at both sides of the convex portion, respectively; and a leaf spring which is provided between the protruding pieces, and wherein the convex portion is disposed on the leaf spring.

* * * * *